(12) United States Patent
Costello et al.

(10) Patent No.: US 8,414,798 B2
(45) Date of Patent: Apr. 9, 2013

(54) PROCESSES AND SYSTEMS FOR PRODUCING SYNGAS FROM METHANE

(75) Inventors: Colleen Costello, Chicago, IL (US); Lisa King, Lake in the Hills, IL (US); Paul Barger, Arlington Heights, IL (US); Deng-Yang Jen, Elk Grove Village, IL (US); Robert B. James, Northbrook, IL (US); Kurt Vanden Bussche, Lake in the Hills, IL (US)

(73) Assignee: UOP LLC, Des Plaines, IL (US)

( * ) Notice: Subject to any disclaimer, the term of this patent is extended or adjusted under 35 U.S.C. 154(b) by 183 days.

(21) Appl. No.: 12/917,781

(22) Filed: Nov. 2, 2010

(65) Prior Publication Data

US 2012/0104322 A1 May 3, 2012

(51) Int. Cl.
*C01B 3/38* (2006.01)
*C01B 3/24* (2006.01)

(52) U.S. Cl. ........................... 252/373; 423/650

(58) Field of Classification Search .................... 252/373
See application file for complete search history.

(56) References Cited

U.S. PATENT DOCUMENTS

| | | | |
|---|---|---|---|
| 5,149,516 A | 9/1992 | Han et al. | |
| 5,447,705 A | 9/1995 | Petit et al. | |
| 6,143,203 A | 11/2000 | Zeng et al. | |
| 6,544,439 B1* | 4/2003 | Lewis et al. | 252/373 |
| 7,070,752 B2* | 7/2006 | Zeng et al. | 423/418.2 |
| 7,223,356 B2 | 5/2007 | Chartier et al. | |
| 7,329,691 B2 | 2/2008 | Basile et al. | |
| 7,332,108 B2 | 2/2008 | Chartier et al. | |
| 2007/0172418 A1* | 7/2007 | Slager et al. | 423/651 |
| 2009/0123354 A1 | 5/2009 | Jan et al. | |
| 2009/0283419 A1 | 11/2009 | Del-Gallo et al. | |
| 2010/0029792 A1 | 2/2010 | Diehl et al. | |
| 2011/0201854 A1* | 8/2011 | Kocal et al. | 585/240 |

OTHER PUBLICATIONS

Khalesi, A., et al., Production of syngas by CO2 reforming on MxLa1-xNi0.3Al0.7O3-d (M=Li, Na, K) catalysts, Industrial and Engineering Chemistry Research, v 47, n 16, p. 5892-5898, Aug. 20, 2008.

Chiu, W., et al., Catalytic performance of perovskite oxide catalysts for partial oxidation of methane to syngas, Gaodeng Xuexiao Huaxue Xuebao, v 23, n 9, p. 1787-1789, 2002.

Requies, J., et al., Partial oxidation of methane to syngas over Ni/MgO and Ni/La2O3 catalysts, Applied Catalysis A: General, v 289, n 2, p. 214-223, Aug. 10, 2005.

Jun, J.H., et al., Nickel-calcium phosphate/hydroxyapatite catalysts for partial oxidation of methane to syngas: Characterization and activation, Journal of Catalysis, v 221, n 1, p. 178-190, Jan. 1, 2004.

Jun, J. H., et al., Nickel-calcium phosphate/hydroxyapatite catalysts for partial oxidation of methane to syngas: Effect of composition, Korean J. Chem. Eng., v 21, n 1, p. 140-146, 2004.

Li, R., et al., Partial Oxidation of Methane to Syngas Using Lattice Oxygen of La1-xSrxFeO3 Perovskite Oxide Catalysts Instead of Molecular Oxygen, Journal of Natural Gas Chemistry, v 11, n 3/4, p. 137-144, 2002.

\* cited by examiner

*Primary Examiner* — Melvin C Mayes
*Assistant Examiner* — Kenneth Vaden
(74) *Attorney, Agent, or Firm* — Mark Goldberg

(57) ABSTRACT

Embodiments of a process for producing syngas comprising hydrogen and carbon monoxide from a gas stream comprising methane are provided. The process comprises the step of contacting the gas stream with a two-component catalyst system comprising an apatite component and a perovskite component at reaction conditions effective to convert the methane to the syngas.

14 Claims, 3 Drawing Sheets

PROCESSES AND SYSTEMS FOR PRODUCING SYNGAS FROM METHANE

FIELD OF THE INVENTION

The present invention relates generally to processes and systems for producing synthesis gas, and more particularly relates to processes and systems for producing synthesis gas comprising hydrogen and carbon monoxide from a gas stream comprising methane.

BACKGROUND OF THE INVENTION

The combustion stoichiometry of methane gas at 1000° F. is highly exothermic and produces carbon dioxide and water according to the following reaction:

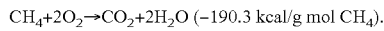

$CH_4 + 2O_2 \rightarrow CO_2 + 2H_2O$ (−190.3 kcal/g mol $CH_4$).

The formed gases are not useful for the production of valuable chemical compounds, and the stability of these products complicates their conversion to more desirable products. Also, further processing is problematic due to the high temperatures generated in the combustion reaction, presenting problems with respect to downstream reactors and catalysts.

In contrast, useful gases, known as synthesis gas or "syngas", are produced in the conversion of methane to a gas mixture containing hydrogen and carbon monoxide, for example, according to one of the following reactions:

$2CH_4 + 2O_2 \rightarrow 2CO + 2H_2 + 2H_2O$ (−64 kcal/g mol $CH_4$)

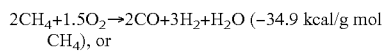

$2CH_4 + 1.5O_2 \rightarrow 2CO + 3H_2 + H_2O$ (−34.9 kcal/g mol $CH_4$), or

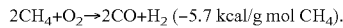

$2CH_4 + O_2 \rightarrow 2CO + H_2$ (−5.7 kcal/g mol $CH_4$).

The last reaction is the most desirable in terms of both quality of the syngas produced and the minimization of the heat liberated to protect the apparatus and catalyst bed from thermal damage.

Conventional syngas-generating processes include steam methane reforming and methane partial oxidation (also referred to as catalytic partial oxidation). The choice of a particular route depends primarily on the desired product composition, as determined by its end use. The syngas is typically used to produce methanol, ammonia, or heavier hydrocarbon fuels through Fisher-Tropsch technology for example.

In the steam methane reforming process, the methane-containing and oxygen-containing feeds are mixed and reacted in a diffusion flame. The oxidized effluent is then passed into a steam reforming reactor zone where the effluent is contacted with a conventional steam reforming catalyst. The catalyst may be present as a simple fixed bed or impregnated into a monolith carrier or ceramic foam. The high temperatures and pressures in the catalytic steam reforming reactor zone place great demands on the reactor, in terms of thermal resistance to damage and operational cost, and on the reforming catalyst, in terms of the catalyst's ability to substantially retain its catalytic activity and stability over many years of use due to substantial coking of the catalyst. Moreover, some of the methane may be burned to provide heat for the energy intensive process and therefore, complete conversion of the methane to the desired end product is not achieved thereby reducing the overall selectivity of the process.

In the methane partial oxidation process, methane is passed along a nickel-based catalyst for example, and burned at a high temperature in an oxygen lean environment where the methane is partially oxidized to carbon monoxide along with the production of hydrogen and some steam. The methane partial oxidation process uses a higher concentration of oxygen than is found in air and, therefore, requires the use of a costly air separation unit to supply the higher concentration of oxygen. Moreover, as in the steam reforming process, the methane partial oxidation process typically burns a portion of the methane to provide heat for the energy intensive process and therefore, complete conversion of the methane to the desired end product is not achieved thereby reducing the overall selectivity of the process. Furthermore, the methane partial oxidation process results in a substantial amount of coke being deposited onto the catalyst and therefore, catalyst activity and stability over time is substantially reduced.

Accordingly, it is desirable to provide processes and systems that provide relatively high conversion of methane to syngas, preferably without depositing substantial amounts of coke onto the catalyst so that the catalyst better maintains its activity and stability over time, and which are robust and cost-effective. Furthermore, other desirable features and characteristics of the present invention will become apparent from the subsequent detailed description of the invention in the appended claims, taken in conjunction with the accompanying drawings and this background of the invention.

SUMMARY OF THE INVENTION

Processes and systems for producing syngas from a methane containing gas stream are provided herein. In accordance with an exemplary embodiment, a process for producing syngas comprising hydrogen and carbon monoxide from a gas stream comprising methane is provided. The process comprises the step of contacting the gas stream with a two-component catalyst system comprising an apatite component and a perovskite component at reaction conditions effective to convert the methane to the syngas.

In accordance with another exemplary embodiment, a system for producing syngas comprising hydrogen and carbon monoxide from a feed gas stream comprising methane is provided. The system comprises a reactor containing a two-component catalyst system comprising an apatite component and a perovskite component. The reactor is configured to receive the feed gas stream and to operate at reactor conditions effective to convert the methane to the syngas thereby converting the two-component catalyst system to a spent two-component catalyst system.

BRIEF DESCRIPTION OF THE DRAWINGS

Embodiments of the present invention will hereinafter be described in conjunction with the following drawing figures, wherein like numerals denote like elements, and wherein.

DETAILED DESCRIPTION

The following Detailed Description is merely exemplary in nature and is not intended to limit the invention or the application and uses of the invention. Furthermore, there is no intention to be bound by any theory presented in the preceding Description of Related Art or the following Detailed Description.

The various embodiments contemplated herein relate to processes and systems for producing syngas comprising hydrogen and carbon monoxide from a methane containing gas stream. The gas stream is contacted with a two-component catalyst system comprising an apatite component and a perovskite component at reaction conditions that convert the methane to syngas. The oxygen for the reaction is supplied by the perovskite component, which is a metal oxide, rather than by an oxygen containing gas stream that is supplied by an air separator or other costly source. In particular, the inventors have discovered that by using the two-component catalyst system with the apatite component, which in at least one embodiment is a nickel containing oxide, the hydrogen atoms become disassociated from the methane such that the methane is activated and readily reacts with the oxygen supplied from the perovskite component at rates that favor a relatively high carbon monoxide selectivity over the production of carbon dioxide or water. Thus, the syngas produced is of preferably high quality having a relatively high carbon monoxide and hydrogen content with reduced amounts of carbon dioxide and water. Moreover, the inventors have found that by using the apatite component, which is unlike many other nickel catalyst used for the partial oxidation of methane, very little coke is deposited onto the two-component catalyst system. Accordingly, when the two-component catalyst system is spent, it can be readily regenerated as needed to maintain catalyst activity and stability over time. Furthermore, regenerating the two-component catalyst produces heat that may be supplied to the reactor to at least partially satisfy the energy requirements, such as, for example, in a fluidized catalytic cracking arrangement (FCC), which thereby places less demand on the system compared to conventional processes in terms of thermal resistance to damage and operational cost.

Figure 1:
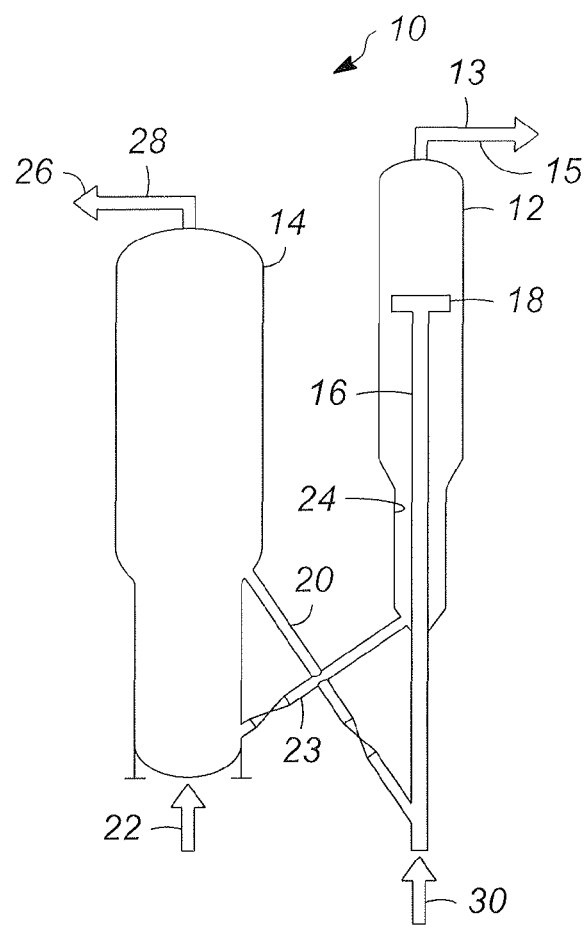
FIG. 1 schematically illustrates a system for producing syngas from a feed gas stream comprising methane in accordance with an exemplary embodiment.

Referring to FIG. 1, a schematic depiction of an exemplary reactor and a regenerator system 10 in accordance with an exemplary embodiment of the present invention is provided. The system 10 is configured as a fluidized catalytic cracking (FCC) arrangement. As shown, the system 10 comprises a reactor 12 that is configured to receive a feed gas stream 30 comprising methane. The reactor 12 contains a two-component catalyst system comprising an apatite component and a perovskite component.

In an exemplary embodiment, the apatite component has a chemical composition on an anhydrous basis expressed by an empirical formula of:

where A is an alkali metal selected from the group consisting of lithium (Li), sodium (Na), potassium (K), rubidium (Rb), cesium (Cs), and mixtures thereof, v is a mole ratio of A:D (i.e., a ratio of the moles of A to the moles of D) and varies from 0 to about 2, B is a basic metal, w is a mole ratio of B:D and varies from about 1 to about 3, t is the weighted average valence of B and varies from about 2 to about 3, E is a transition metal selected from the group consisting of nickel (Ni), vanadium (V), manganese (Mn), iron (Fe), cobalt (Co), copper (Cu), and mixtures thereof, x is a mole ratio of E:D and varies from 0 to about 0.5, D is a framework component selected from the group consisting of phosphorus (P), V, and mixtures thereof, and G is an anionic species of hydroxide (OH), chlorine (Cl), fluorine (F), carbonate ($CO_3$), and mixtures thereof, u is an average valence of G and varies from about 1 to about 2, y is a mole ratio of G:D and varies from 0 to about 2, z is a mole ratio of O:D and has a value determined by the equation:

$$z = \tfrac{1}{2}(y + t \cdot w + 2 \cdot x + 5 - u \cdot y),$$

and when B is calcium (Ca), v is not 0. In a preferred embodiment, G is the anionic species of OH, and the apatite is a hydroxyapatite structured component. In a most preferred embodiment, E is Ni and the apatite component is a nickel-based hydroxyapatite structured component.

The basic metal B is typically a metal with a rather large cationic radius, generally from about 0.85 Å to about 1.40 Å, and a cationic charge of +2 or +3. These metals are broadly found in the alkaline earth series, rare earth series, and in selected cases in both the transition metal series, such as Cd and Hg, and the main group metals such as lead (Pb). Preferably, B is selected from the group consisting of Ca, strontium (Sr), cadmium (Cd), Pb, barium (Ba), lanthanum (La), europium (Eu), gadolinium (Gd), praseodymium (Pr), neodymium (Nd), samarium (Sm), yttrium (Y), ytterbium (Yb), and mixtures thereof.

In an exemplary embodiment, the perovskite component comprises perovskite having a chemical composition expressed by an empirical formula of:

where Ma and Ma', that are identical or different, are chosen from the families of the alkaline earths, the lanthanides or the actinides, more particularly from La, Ce, Pr, Nd, promethium (Pm), Sm, Eu, Gd, terbium (Tb), dysprosium (Dy), holmium (Ho), erbium (Er), thulium (Tm), Yb, lutetium (Lu), Y, magnesium (Mg), Ca, Sr, Ba, and mixtures thereof, Mb and Mb', that are identical or different, represent one or more atoms chosen from transition metals, and more particularly from Sc, titanium (Ti), V, chromium (Cr), Mn, Fe, Co, Ni, Cu, zinc (Zn), gallium (Ga), and mixtures thereof, x and y, that are identical or different, are greater than or equal to 0 and less than or equal to about 1, and w is such that the perovskite has an electrically neutral structure. In preferred embodiments, the perovskite component comprises La, Sr, Fe, or mixtures thereof.

In an exemplary embodiment, the two-component catalyst system is configured as particles where each particle comprises the apatite component and the perovskite component. In one example, the apatite component is crystallized onto the perovskite component to form the particles. Alternatively, both the apatite and perovskite components may be bound to a carrier, such as, for example, alumina or silica. In another exemplary embodiment, the two-component catalyst system is a physical mixture of the apatite and perovskite components. Preferably, the two-component catalyst system has a mole ratio of the apatite component to the perovskite component of from about 1:2 to about 2:1, and most preferably of about 1:1.

Figure 2:
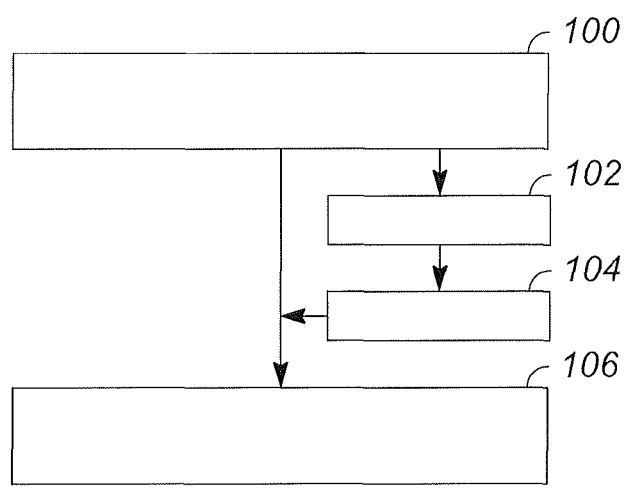
FIG. 2 is a flowchart of a process for producing syngas from a gas stream comprising methane in accordance with an exemplary embodiment.

Referring also to FIG. 2, a process for producing the syngas includes contacting the feed gas stream 30 with the two-component catalyst system (step 100) in the reactor 12 which is operating at reaction conditions effective to convert the methane to an effluent stream comprising syngas 13 which may be passed along for subsequent processing via line 15. In one exemplary embodiment, the reactor 12 is operating at a reaction temperature of about 650° C. or greater, and preferably at a reaction temperature of from about 850 to about 1000° C. In another exemplary embodiment, the reactor 12 is operating at a reaction pressure of from about 15 to about 1000 psia, and preferably of from about 15 to about 600 psia, and more preferably of from about 15 to about 350 psia. Preferably, the atmosphere inside the reactor 12 is substantially devoid of gaseous oxygen so that the oxygen source for the partial oxidation of methane comes primarily from the perovskite component. Without being limited by theory, the inventors believe that by limiting the source of oxygen to the perovskite component, the partial oxidation of methane will primarily favor producing carbon monoxide and hydrogen over the more highly oxidized and undesirable products of carbon dioxide and water.

In an exemplary embodiment, the apatite component of the two-component catalyst system activates the methane (step 102) to form activated methane. The activated methane then readily oxidizes with oxygen from the perovskite component (step 104) to form the syngas 13. During the partial oxidation process of the methane, the perovskite component becomes oxygen depleted, and a relatively small amount of carbonaceous byproduct, termed coke, is deposited on the two-component catalyst system reducing its catalytic activity and forming a spent two-component catalyst system.

A regenerator 14 is in fluid communication with the reactor 12 to receive the spent two-component catalyst system via line 23. The regenerator 14 is configured to receive an oxygen containing gas stream 22, preferably air, from an outside source. The regenerator 14 operating at regeneration conditions receives the oxygen containing gas stream 22, oxidizes the perovskite component and burns the coke off the spent two-component catalyst system to regenerate the spent two-component catalyst system (step 106) thereby producing a flue gas 26 that exits a flue gas line 28 to a flue gas system. The flue gas 26 may comprise carbon dioxide, steam, $SO_x$, and nitrogen ($N_2$), but it is typically very rich in $N_2$. In one exemplary embodiment, the regenerator is operating at a regeneration temperature of from about 500 to about 1000° C., and preferably of from about 650 to about 1000° C.

The regenerator 14 reactivates the two-component catalyst system so that, when returned to the reactor 12, the catalyst system is in optimum condition to perform its partial oxidation of methane function. The regenerator 14 serves to oxidize the two-component catalyst system, gasify the coke deposited on the catalyst system, and at the same time, to preferably impart sensible heat to the regenerated two-component catalyst system. The energy carried by the hot regenerated catalyst system may be used to satisfy at least a portion of the thermal requirements for the reactor 12. In an exemplary embodiment, the two-component catalyst system is bound to a high heat capacity carrier, preferably alumina, which facilitates the transfer of heat from the regeneration process to the reactor 12.

The hot regenerated catalyst is fed back to the reactor 12 via the reactivated catalyst return line 20 and is mixed with the feed gas stream 30 and the mixture is carried upwards through a riser 16 of the reactor 12 with a minimum of back mixing. At the top 18 of the riser 16, the partial oxidation of methane has been completed and the two-component catalyst system is spent and quickly separated from the syngas where it is returned back to the regenerator 14 via line 23.

Figure 3:
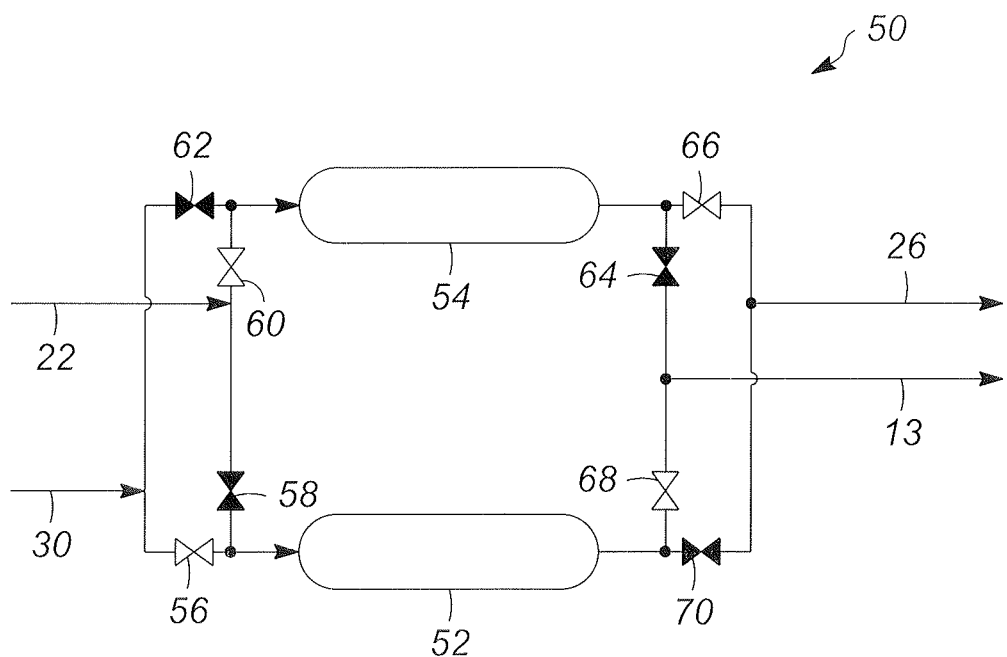
FIG. 3 schematically illustrates a system in a first configuration for producing syngas from a feed gas stream comprising methane in accordance with another exemplary embodiment.
Figure 4:
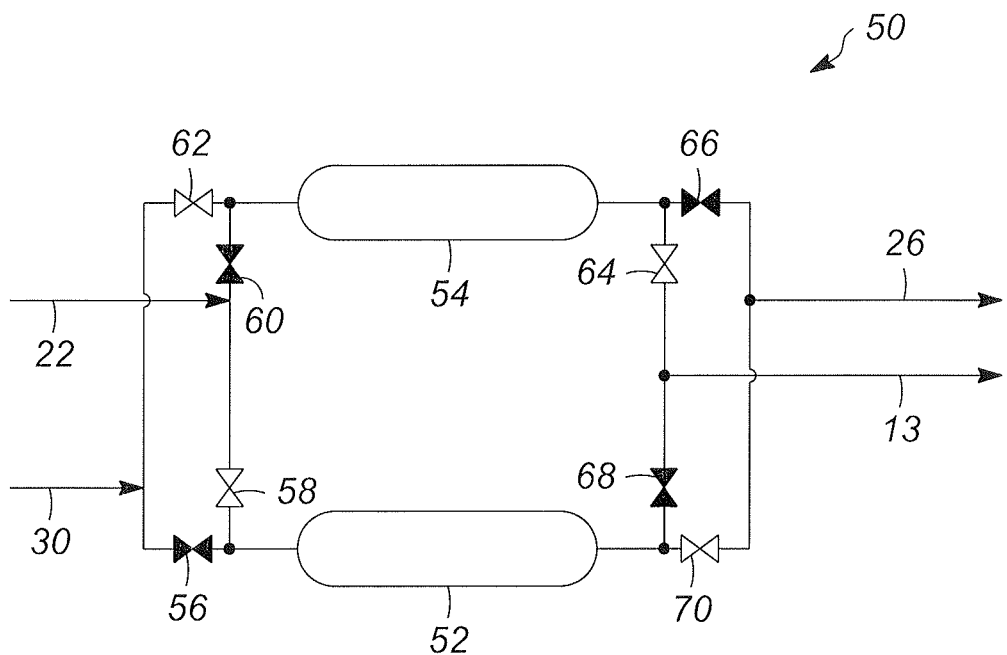
FIG. 4 schematically illustrates the system depicted in FIG. 3 in a second configuration.

Referring to FIGS. 3 and 4 a schematic depiction of an alternative exemplary reactor and a regenerator system 50 in accordance with an embodiment of the present invention is provided. The system comprises a first vessel 52 and a second vessel 54 that are fixed catalyst beds configured as a swing bed reactor arrangement. The first and second vessels 52 and 54 are in selective fluid communication with both the feed gas stream 30 and the oxygen containing gas stream 22 via a plurality of valves 56, 58, 60, 62, 64, 66, 68, and 70. As illustrated in FIG. 3, the feed gas stream 30 is advanced to the first vessel 52 through the opened valve 56. Fluid communication of the feed gas stream 30 to the second vessel 54 is prevented by the closed valves 58 and 62. The oxygen containing gas stream 22 is advanced to the second vessel 54 through the opened valve 60, and is prevented from being fluidly communicated to the first vessel 52 by the closed valves 58 and 62. In this scenario, the first vessel 52 contains the two-component catalyst system (as discussed in the foregoing paragraphs) and the second vessel 54 contains the spent two-component catalyst system (as discussed in the foregoing paragraphs). Accordingly, the first vessel 52 effectively operates as a reactor for producing syngas 13 from methane, and a second vessel 54 effectively operates as a regenerator for regenerating the spent two-component catalyst system thereby producing a flue gas stream 26. The first vessel 52 fluidly communicates the syngas 13 through the opened valve 68 where the closed valves 64 and 70 prevent intermixing with the flue gas stream 26. The second vessel 54 fluidly communicates the flue gas stream 26 through the opened valve 66.

When the two-component catalyst system in the first vessel 52 is spent and the spent two-component catalyst system in the second vessel 54 is regenerated, the valve arrangement switches from opened to closed and vice versa as illustrated in FIG. 4 so as to fluidly communicate the feed gas stream 30 to the second vessel 54, and to fluidly communicate the oxygen containing gas stream 22 to the first vessel 52. In particular, the opened valve 62 and the closed valves 56 and 60 direct the feed gas stream 30 to the second vessel 54 while preventing fluid communication of the feed gas stream 30 to the first vessel 52. The opened valve 58 and the closed valves 56 and 60 direct the oxygen containing gas stream 22 to the first vessel 52 while preventing fluid communication of the oxygen containing gas stream to the second vessel 54. In this scenario, the second vessel 54 effectively operates as a reactor for producing syngas 13 from methane and the first vessel 52 effectively operates as a regenerator to regenerate the spent two-component catalyst system thereby producing flue gas stream 26. The second vessel 54 fluidly communicates the syngas 13 through the opened valve 64 where the closed valves 66 and 68 prevent intermixing with the flue gas stream 26. The first vessel 52 fluidly communicates the flue gas stream 26 through the opened valve 70.

The synchronized alternating of the valves 56, 58, 60, 62, 64, 66, 68, and 70 from opened to closed and vice versa based on the oxidative condition of the two-component catalyst system in each of the vessels 52 and 54 is preferably repeated on a continuous basis to provide a continuous flow system for the production of syngas. In an exemplary embodiment, the first and second vessels 52 and 54 operate at essentially the same operating conditions with regard temperature and pressure for both the partial oxidation of methane and the regeneration of the spent catalyst system to facilitate the continuous production of the syngas 13. Other suitable swing bed reactor arrangements known to those skilled in the art may also be used for partial oxidation of methane and regeneration of the spent catalyst system in accordance with various embodiments of the present invention.

Figure 5:
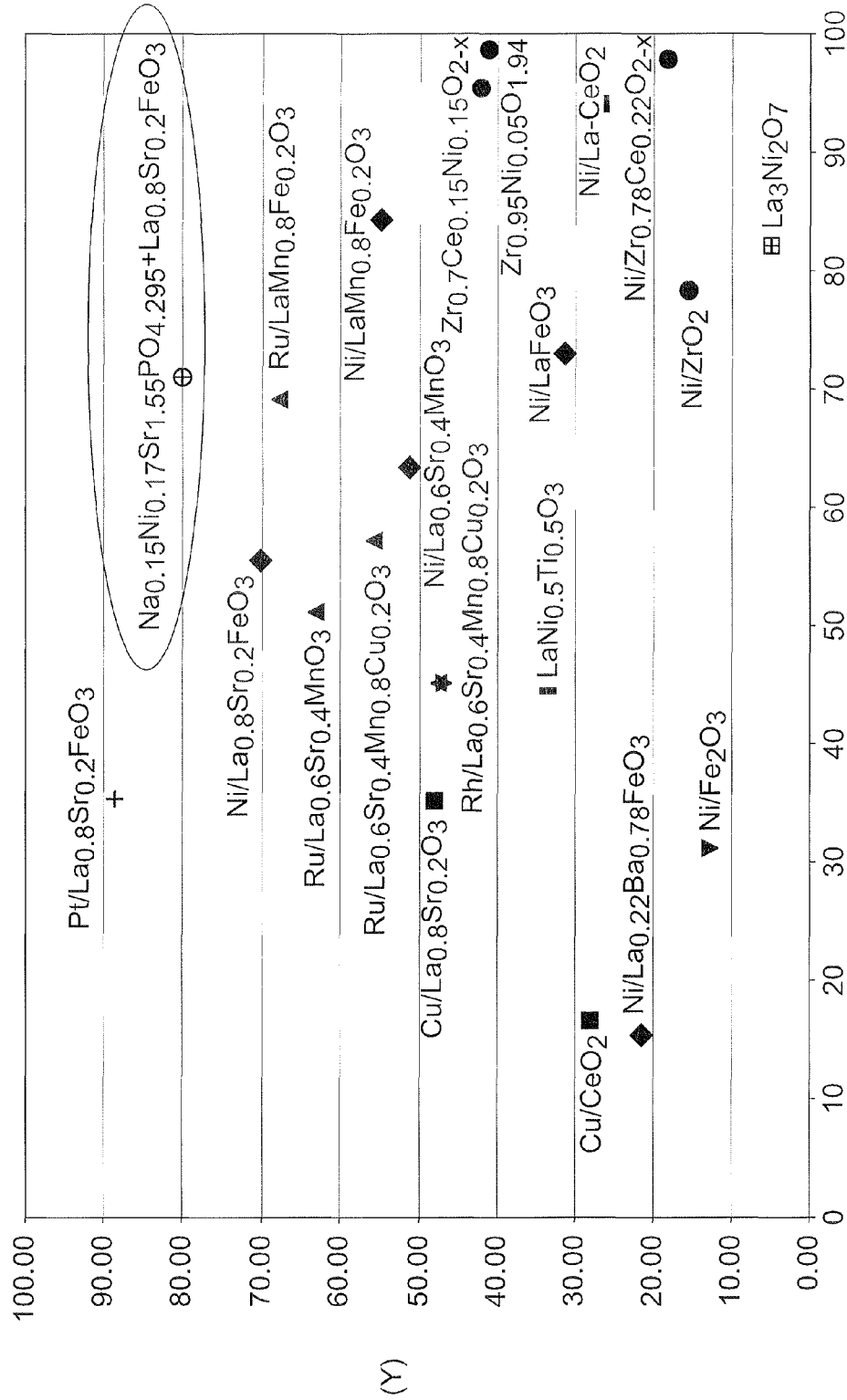
FIG. 5 is a graphical representation of carbon monoxide selectivity and methane conversion for various catalyst systems in accordance with an exemplary embodiment of the present invention.

FIG. 5 is a graphical representation of a material screening evaluation of various catalyst systems in terms of their carbon monoxide selectivity and methane conversion at 860° C. The vertical axis (Y) represents the maximum carbon monoxide (CO) selectivity in terms of mole percentage (%), and the horizontal axis (X) represents the methane conversion at maximum CO yield %. In general, catalyst systems with a relatively high methane conversion indicate a relatively high conversion level for methane to various products. Catalyst systems with a relatively high maximum CO selectivity indicate that the products formed from the methane conversion favor carbon monoxide, and not carbon dioxide or water. Accordingly, catalyst systems with performance results in the upper right-hand corner of the material screening chart are most suitable for producing a high quality syngas stream in accordance with the present invention.

The catalyst systems evaluated were two-component catalyst systems comprising a metal component and a perovskite component, two-component catalyst systems comprising a metal component and a metal oxide component, and a two-component catalyst system comprising a hydroxyapatite component and a perovskite component. As indicated in FIG. 4, the two-component catalyst system with a hydroxyapatite component and a perovskite component, $Na_{0.15}Ni_{0.17}Sr_{1.55}PO_{4.295}+La_{0.8}Sr_{0.2}FeO_3$, is in the upper most right-hand corner of the chart having a maximum CO selectivity of about 80% and a methane conversion at maximum CO yield % of greater than about 70%. The inventors have found that catalyst system having a methane conversion at maximum CO yield of about 70% or greater, and a maximum CO selectivity of about 70% or greater are suitable catalyst for partial oxidation of methane in the absence of an oxygen containing atmosphere to provide a high quality syngas reaction product. Accordingly, the $Na_{0.15}Ni_{0.17}Sr_{1.55}PO_{4.295}+La_{0.8}Sr_{0.2}FeO_3$ two-component catalyst system was found to be the most suitable catalyst system in those evaluated in this material screening study.

Accordingly, processes and systems for producing syngas comprising hydrogen and carbon monoxide from a methane containing gas stream have been described. The various embodiments comprise contacting the gas stream with a two-component catalyst system comprising an apatite component and a perovskite component at reaction conditions that convert the methane to syngas. The oxygen for the reaction is supplied by the perovskite component rather than in a gaseous stream by an air separator or other costly source. Moreover, the apatite component facilitates partial oxidation of methane by activating the methane so that it readily reacts with the oxygen from the perovskite component at rates that favor a relatively high carbon monoxide selectivity over the production of carbon dioxide or water. Thus, the syngas produced is preferably high-quality having a relatively high carbon monoxide and hydrogen content with minimal carbon dioxide and water content. Moreover, by using the apatite component in combination with the perovskite component, very little coke is deposited onto the two-component catalyst during partial oxidation of the methane. Accordingly, when the two-component catalyst system is spent, it can be readily regenerated as needed to maintain catalyst activity and stability over time. Furthermore, regenerating the two-component catalyst produces heat that may be supplied to the reactor to at least partially satisfy the energy requirements, such as, for example, in a FCC arrangement, which thereby places less demand on the system compared to conventional processes in terms of thermal resistance to damage and operational cost.

While at least one exemplary embodiment has been presented in the foregoing Detailed Description, it should be appreciated that a vast number of variations exist. It should also be appreciated that the exemplary embodiment or exemplary embodiments are only examples, and are not intended to limit the scope, applicability, or configuration of the invention in any way. Rather, the foregoing Detailed Description will provide those skilled in the art with a convenient road map for implementing an exemplary embodiment of the invention, it being understood that various changes may be made in the function and arrangement of elements described in an exemplary embodiment without departing from the scope of the invention as set forth in the appended Claims and their legal equivalents.

What is claimed is:

1. A process for producing syngas comprising hydrogen and carbon monoxide from a gas stream comprising methane, the process comprising the step of:
    contacting the gas stream with a two-component catalyst system comprising an apatite component and a perovskite component in an atmosphere substantially devoid of a gaseous oxygen source so that the oxygen source for partial oxidation of the methane comes primarily from the perovskite component and at reaction conditions effective to convert the methane to the syngas; and
    regenerating the two-component catalyst system comprising burning coke off the catalyst system and oxidizing the perovskite component.

2. The process according to claim 1, wherein the reaction conditions include a reaction temperature of about 650° C. or greater.

3. The process according to claim 2, wherein the reaction temperature is from about 850 to about 1000° C.

4. The process according to claim 1, wherein the reaction conditions include a reaction pressure of about 15 to about 1000 psia.

5. The process according to claim 1, wherein the two-component catalyst system is a physical mixture of apatite catalyst particles and perovskite catalyst particles.

6. The process according to claim 1, wherein the two-component catalyst system comprises particles each comprising the apatite component and the perovskite component.

7. The process according to claim 6, wherein each of the particles further comprises alumina or silica bound to the apatite and perovskite components.

8. The process according to claim 1, wherein the apatite component has a chemical composition on an anhydrous basis expressed by an empirical formula of:

where A is an alkali metal selected from the group consisting of Li, Na, K, Rb, Cs, and mixtures thereof, v is a mole ratio of A:D and varies from 0 to about 2, B is a basic metal selected from the group consisting of Ca, Sr, Cd, Pb, Ba, La, Eu, Gd, Pr, Nd, Sm, Y, Yb, and mixtures thereof, w is a mole ratio of B:D and varies from about 1 to about 3, t is the weighted average valence of B and varies from about 2 to about 3, E is a transition metal selected from the group consisting of Ni, V, Mn, Fe, Co, Cu, and mixtures thereof, x is a mole ratio of E:D and varies from 0 to about 0.5, D is a framework component selected from the group consisting of P, V, and mixtures thereof, and G is an anionic species of OH, Cl, F, $CO_3$, and mixtures thereof, u is an average valence of G and varies from about 1 to about 2, y is a mole ratio of G:D and varies from 0 to about 2, z is a mole ratio of O to D and has a value determined by the equation:

$$z=1/2(v+t\cdot w+2\cdot x+5-u\cdot y),$$

and when B is Ca, v is not 0.

9. The process according to claim 8, wherein G is the anionic species of OH, and the apatite is a hydroxyapatite, defining the apatite component as a hydroxyapatite component.

10. The process according to claim 1, wherein the perovskite component comprises perovskite having a chemical composition expressed by an empirical formula of:

where Ma and Ma' are selected from the group consisting of La, Ce, Pr, Nd, Pm, Sm, Eu, Gd, Tb, Dy, Ho, Er, Tm, Yb, Lu, Y, Mg, Ca, Sr, Ba, and mixtures thereof, Mb and Mb' are transition metals, x and y are greater than or equal to 0 and less than or equal to about 1, and w is such that the perovskite has an electrically neutral structure.

11. The process according to claim 10, wherein Mb and Mb' are selected from the group consisting of Sc, Ti, V, Cr, Mn, Fe, Co, Ni, Cu, Zn, Ga, and mixtures thereof.

12. The process according to claim 1, wherein the two-component catalyst system has a methane conversion at maximum CO yield of about 70% or greater, and a maximum CO selectivity of about 70% or greater.

13. The process according to claim 1, wherein the two-component catalyst system has a mole ratio of the apatite component to the perovskite component of about 1:2 to about 2:1.

14. The process according to claim 1, wherein the step of contacting the gas stream with the two-component catalyst system comprises activating the methane with the apatite component to form an activated methane, and oxidizing the activated methane with the perovskite component to form the syngas and produce a spent two-component catalyst system, wherein the regenerating comprises contacting the spent two-component catalyst system with gas comprising oxygen at regeneration conditions effective to regenerate the spent two-component catalyst system, producing a regenerated two-component catalyst system.

* * * * *